Aug. 11, 1959 R. L. CRANE ET AL 2,898,669
MACHINE FOR CUTTING OFF BAR STOCK
Filed Nov. 14, 1957 7 Sheets-Sheet 1

Inventors
Robert L. Crane
Charles E. Cleland
Charles H. Whitmore
By
Attorney

Aug. 11, 1959     R. L. CRANE ET AL     2,898,669
MACHINE FOR CUTTING OFF BAR STOCK
Filed Nov. 14, 1957                    7 Sheets-Sheet 5

Inventors
Robert L. Crane
Charles E. Cleland
Charles H. Whitmore

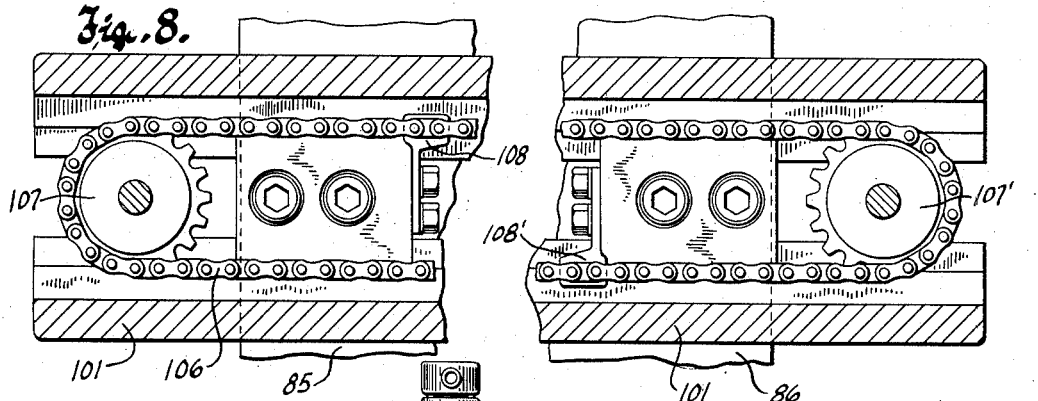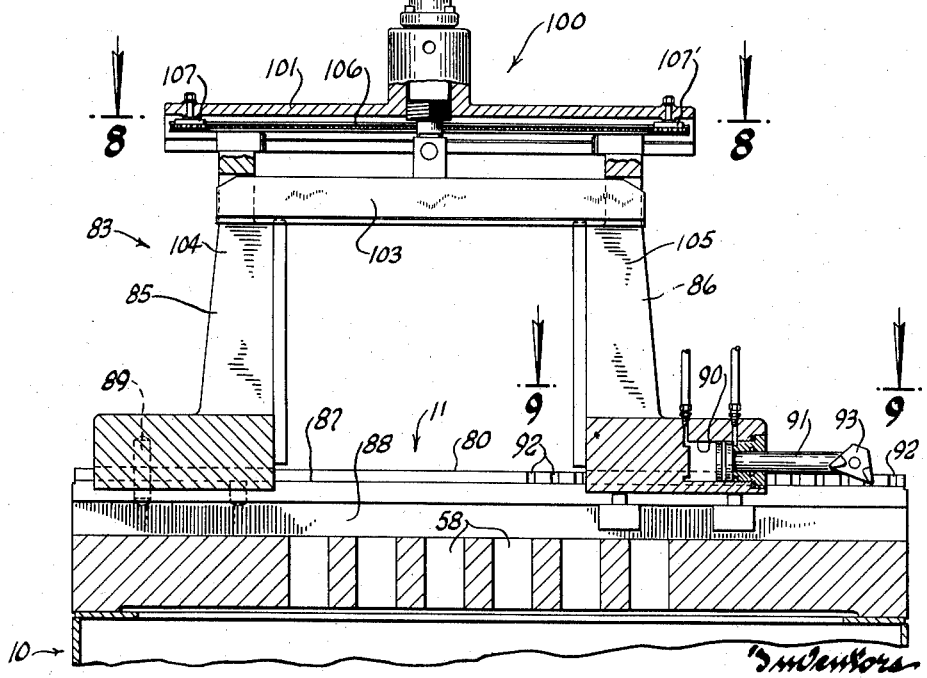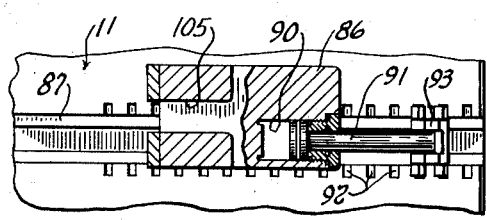

United States Patent Office 2,898,669
Patented Aug. 11, 1959

2,898,669

MACHINE FOR CUTTING OFF BAR STOCK

Robert L. Crane, Hopkins, and Charles E. Cleland and Charles H. Whitmore, Minneapolis, Minn., assignors to Continental Machines, Inc., Savage, Minn., a corporation of Minnesota Application November 14, 1957, Serial No. 696,502

7 Claims. (Cl. 29—68)

This invention relates to a method and machine for cutting off bar stock, and, more particularly, to metal cutting saws of the endless band type such as that forming the subject matter of the pending application for patent, Serial No. 533,786, of which this application is a continuation-in-part. As such, this invention contemplates the use of an endless saw band trained over a pair of horizontally spaced pulleys mounted on a frame or head which moves vertically downward during the cutting operation, the pulleys being so mounted that the opposite stretches of the band are vertically spaced. Obviously, this entails twisting the stretch of the band which does the cutting to dispose the same in a vertical plane.

Heretofore, the saw band was always so mounted and arranged that the cutting was done by its lower stretch. Accordingly, the entire movable head with all of the mechanism thereon had to be lifted high above the work support to permit the work to be placed in position beneath the lower stretch of the band. In machines of relatively small capacity, this presented no serious problem, but in a cut-off saw designed to handle large cross sections, the need for elevating the saw head far enough to bring the lower stretch of the band above the work created a serious problem. The seriousness of this problem can be readily appreciated from the fact that the machine of this invention is designed to cut off steel bar stock 18 by 24 inches in cross section, and to use a two inch saw band which requires a pulley diameter of at least 26 inches. To meet these requirements, the saw carrying head of necessity becomes a large and relatively heavy structural unit, and to lift this to the height needed with past practice would not only create a very serious problem from the standpoint of the overall size of the machine, especially the height thereof, but manifestly it would introduce difficulties in properly guiding the movable head and constraining it to smooth vertical downward translation.

With a view toward overcoming this disadvantage of all prior endless band type cut-off machines, this invention has as one of its objects to provide a metal cutting band saw of the cut-off type, wherein the saw band is trained about horizontally spaced pulleys so disposed that the opposite stretches of the band are vertically spaced apart, and which machine is characterized by the fact that the upper stretch of the band is twisted to dispose a substantial medial portion thereof in a vertiacl plane with its toothed edge facing downwardly to engage and cut through work placed between the two stretches of the band.

Bearing in mind that in the power saw of this invention, the cutting is done by the upper stretch of the band, and that liquid coolant is copiously supplied to the band as it enters the work so that there is a constant stream of coolant and chips falling from the upper stretch of the band, it is another object of this invention to so mount the band that the lower stretch thereof is horizontally spaced to one side of the plane of the cutting action so as to be more easily protected against having chips and coolant drop thereon which, if permitted, would seriously interfere with proper operation of the saw.

Another object of this invention is to assure smooth chatter-free descent of the saw as it cuts through the work, by positively constraining the movable saw carrying head to vertical translation by means of a torque rod, so connected with the movable head that both ends of the head must move in unison.

Still another object of this invention is to provide an improved and simplified manner of automatically ridding the machine of accumulated chips.

With these and other objects in view which will appear as the description proceeds, this invention resides in the novel construction and arrangement of parts substantially as hereinafter described, and more particularly defined by the appended claims, it being understood that such changes in the precise embodiment of the herein-disclosed invention may be made as come within the scope of the claims.

The accompanying drawings illustrate one complete example of the physical embodiment of the invention, constructed according to the best mode so far devised for the practical application of the principles thereof, and in which:

Figure 7 is a cross sectional view through Figure 3 on the plane of the line 7—7, and illustrates particularly the main or inboard work clamping vise;

Figure 8 is a detail sectional through Figure 7 on the plane of the line 8—8; and Figure 9 is a fragmentary detail sectional view through Figure 7 on the plane of the line 9—9.

*The general organization of the machine*

Figure 6:
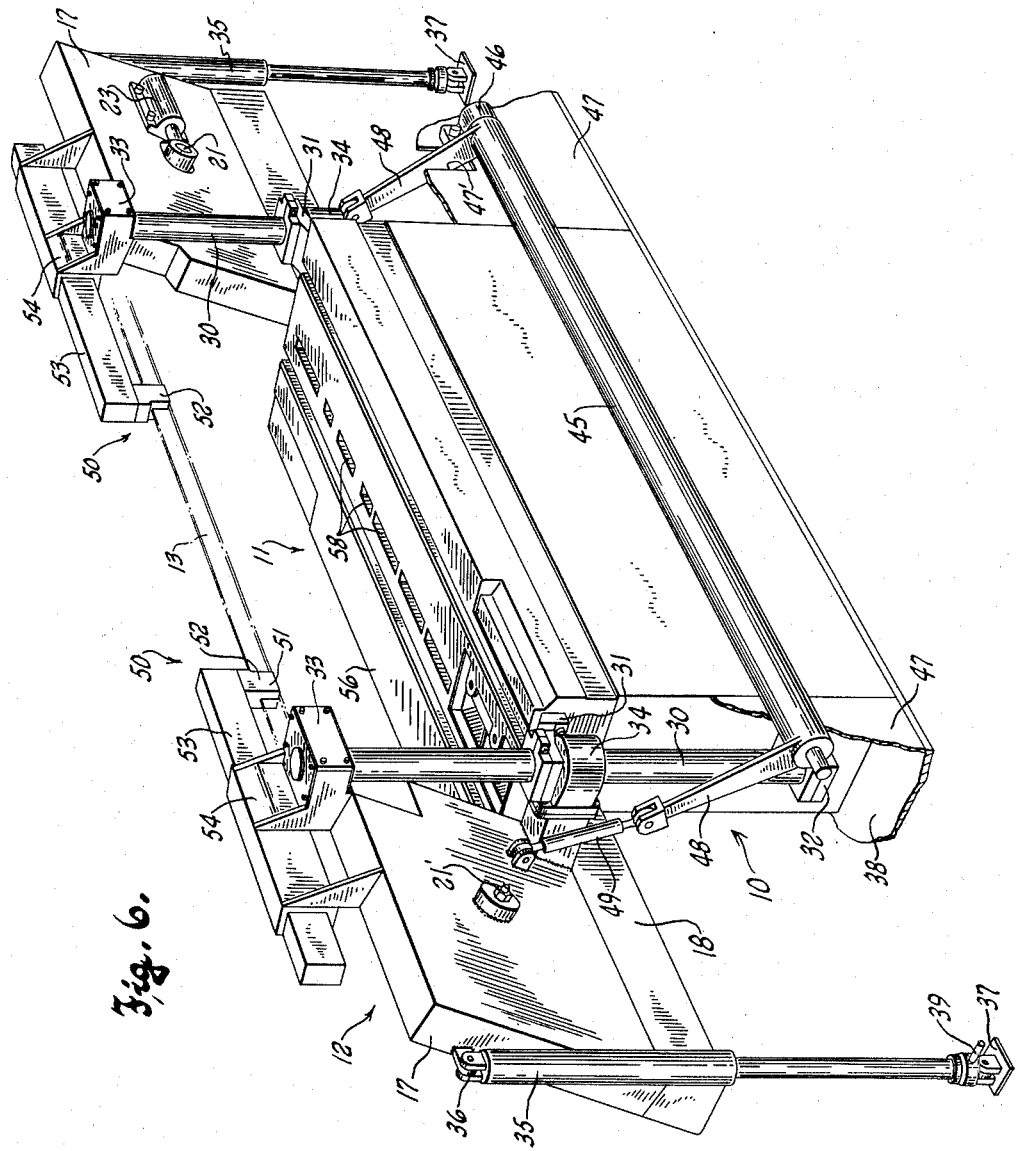
Figure 6 is a perspective view of the main portion of the saw illustrating the same from the rear and omitting much of the structure for the purposes of clarity, this view being primarily intended to illustrate how the motion of the movable saw head is guided and constrained to vertical translation.

Referring now more particularly to the accompanying drawings, in which like numerals are applied to like parts, the numeral 10 designates generally the base of the power saw which, as best illustrated in Figure 6, is in the nature of a rectangular or oblong box, the top of which provides a horizontal work support, indicated generally by the numeral 11.

Supported on the base 10 is a movable saw head, indicated generally by the numeral 12, which mounts an endless saw band 13, and is supported from the base 10 for bodily vertical translation to raise and lower the cutting stretch of the band in a vertical plane from and toward the work support 11.

Work to be cut is placed upon a feed table, designated generally by the numeral 14, which extends rearwardly from the base and has a row of rollers 14' mounted thereon to receive and convey the work to the saw. The tops of the rollers are, of course, in horizontal alignment with the top of the work support 11. A receiving table, indicated generally by the numeral 15, is also provided. This table is located in front of the base in line with the feed table and, like it, has a row of rollers 15' to receive and carry away the work pieces as they are cut off.

It should be appreciated, however, that the power saw is a complete machine without the feed and receiving tables, and that means other than these tables may be provided to feed bar stock or other work to the saw and reecive the pieces cut therefrom. It has been found desirable, though, for the sake of completeness and to assure best results, to equip the saw with the feed and receiving tables.

The entire operation of the machine is controlled from a panel or console, designated generally by the numeral 16, connected with the machine by a flexible cable 16' which contains hydraulic and electrical control lines by which the control instrumentalities on the panel or console are operatively connected with the drive motors and other power actuated devices by which the machine is driven and operated.

The movable saw head

The movable saw head 12 is a wide U-shaped rigid structure having relatively short horizontally spaced arms 17 connected by a long horizontal bight 18. Although the specific construction of this U-shaped saw head may take any suitable form, it is preferably fabricated from plate stock welded together into a hollow unit. This construction achieves the necessary strength and rigidity with minimum weight.

The arms 17 have pulleys 19—19' mounted thereon to turn about horizontally spaced parallel axes with their rims 20 in line. To this end, the pulleys are journalled on shafts 21—21' which project perpendicularly from the front faces of the arms. Any suitable bearing structure 22 may be employed to freely rotatably mount each pulley upon its respective shaft; and the endless saw band 13 is, of course, trained about the rims of the pulleys.

Any suitable means may be used to vary the distance between the pulleys to thereby tension or relax the band. For purposes of illustration, one of the pulley shafts, in this case the right hand shaft 21', is fixed to its arm of the head, but the other shaft 21 is carried by a slide 23 adjustably mounted on its arm. Any suitable means, either manual or power driven, may be employed to move the slide 23 as required.

Figure 4:
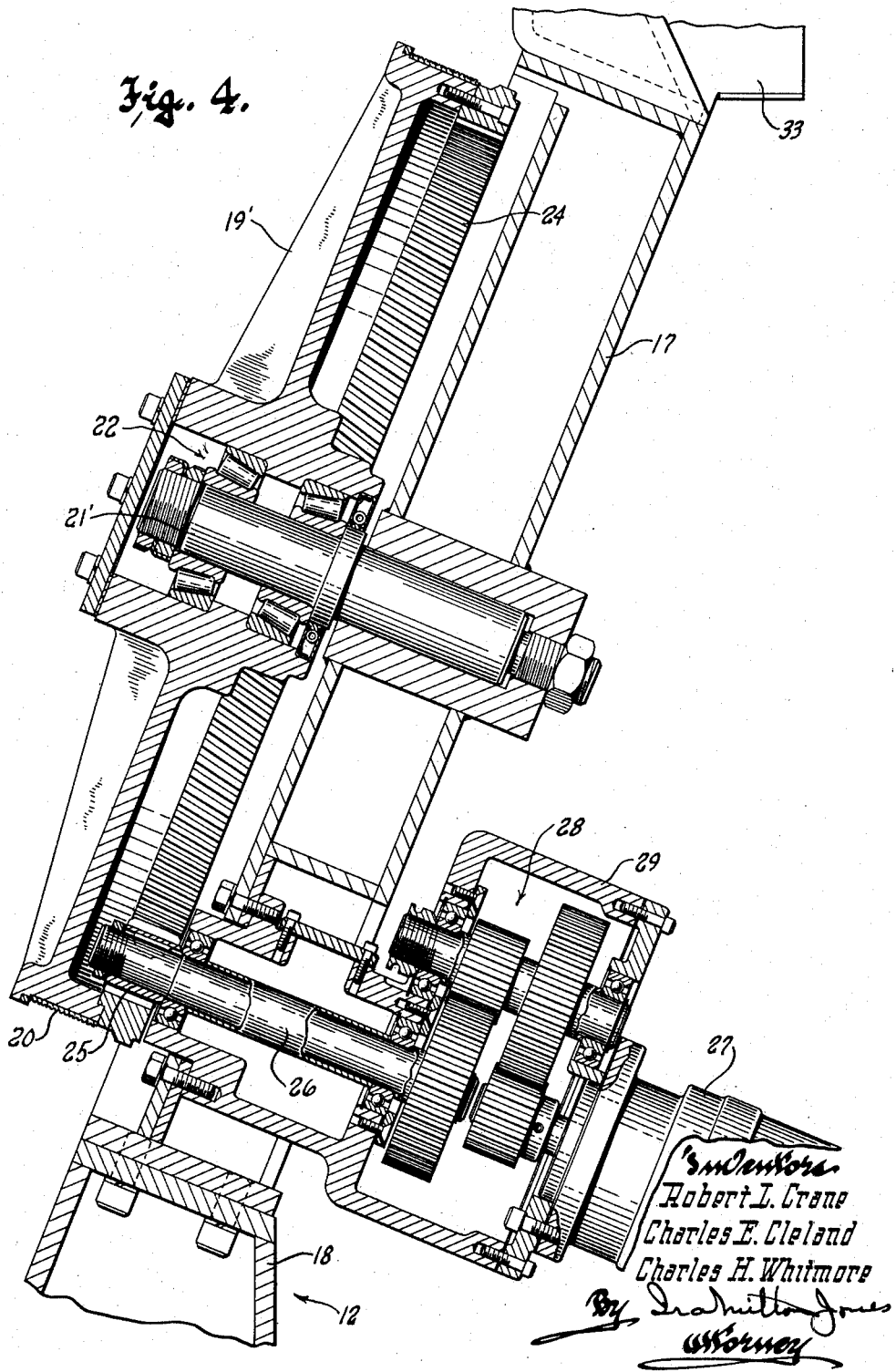
Figure 4 is a cross sectional view through Figure 2 on the plane of the line 4—4.

The right hand pulley 19' is power driven, but the specific means employed to drive this pulley, and hence the band, forms no part of this invention. A satisfactory way of driving this pulley is illustrated in Figure 4. As here shown, the rim 20 of the pulley has an internal gear 24 fixed thereto, and meshing with this gear is a pinion 25. The pinion 25 is fixed to a shaft 26 which, in turn, is driven by a motor 27 through reduction gearing 28. The reduction gearing and the drive shaft 26 are enclosed within a housing 29 which is mounted upon the rear of the U-shaped head, and the motor 27 is fixed to this housing so that the driving connection between the motor and the driven pulley is, at all times, positively maintained.

Although the motor 27 could be an electric motor, it is preferably hydraulic, since the speed of a hydraulic motor is more simply and easily regulated. It is, of course, to be understood that the motor 27 is of the variable speed rotary type and that it is connected with a source of hydraulic fluid pressure under control of suitable control instrumentalities on the panel or console 16.

The mounting of the movable head

The mounting of the movable head and, more particularly, its relationship to the work support 11, is one of the most important features of this invention.

As brought out in the statement of objects, one of the purposes of this invention is to provide a power saw which, though capable of cutting through bar stock of excessively large cross section, is still a compact machine, and especially a much lower machine than would be the case if the conventional method of sawing with a band saw were employed.

It is to this end that the movable saw carrying head is so mounted and related to the base that the upper stretch of the saw band is the one by which the cutting is done, the lower stretch of the band being at all times beneath the stationary horizontal work support 11. Accordingly, the head 12 is slidably mounted upon a pair of parallel upright posts 30 fixed to the opposite ends of the base 10 and projecting upwardly therefrom. The posts are secured to the ends of the base by suitable brackets 31 and 32, and vertically spaced bearings 33 and 34 fixed to the rear of the U-shaped head 12 slidably embrace the posts.

These bearings and posts thus constitute cooperating means on the movable head and the base to mount the head for vertical translation.

Attention is directed to the fact that the U-shaped head is disposed at an angle to the vertical, with the extremities of its arms 17 closer to the plane containing the axes of the posts 30 than the bight connecting the lower ends of the arms, and since the axes of the shafts 21—21' about which the pulleys rotate are normal to the front face of the arms, it follows that the upper stretch of the band though vertically spaced above the lower stretch thereof, travels in a path displaced rearwardly of that along which the lower stretch moves as the head is raised and lowered.

The purpose of this horizontal displacement or offset between the upper and lower stretches will be explained hereinafter.

To effect vertical translation of the head, hydraulic motors 35 are provided. These hydraulic motors may take any suitable form, but in the present case, each motor comprises a pair of telescoping upper and lower cylinders, the upper ones of which are connected, as at 36, to the movable head, and the lower ones of which are anchored as at 37, to the bottom wall 38 of the base. By supplying hydraulic fluid under pressure to these motors 35, the head will be elevated, and by controlling the discharge of such fluid from the motors, descent of the head by gravity will be controlled.

Again, it is to be understood that suitable ducts, not shown, are provided to connect the ports 39 of the hydraulic motors 35 with a source of hydraulic fluid pressure under control of one of the instrumentalities on the panel or console.

As can be readily appreciated, it is important that the vertical translation of the saw carrying head be free and smooth, which means that the bearings 33 and 34 by which the head is slidably mounted upon the posts 30, may not bind or cock as they travel along the posts. To assure against this possibility, a torque rod 45 journalled in bearings 46 carried by walls 47 which extend out from the opposite ends of the base is connected to the movable head to control its motion. Although Figure 6 provides the best illustration of the torque rod, one of its bearings 46 has been omitted from this view for the sake of clarity. Lever arms 48 fixed to the ends of the torque rod and links 49 pivotally connected to the ends of the lever arms and the back of the head, provide the connection between the torque rod and the head. The lever arms are fixed to the rod in exact angular alignment, and are of equal length; the links 49 are likewise of equal length; and the bearings 46 are so placed that the axis of the torque rod is exactly horizontal and equispaced from the two posts. It follows, therefore, that the torque rod constrains both ends of the head to move up and down in unison under the control of the hydraulic motors 35.

Saw band guides

As noted hereinbefore, it is the upper stretch of the saw band which does the cutting, and since the head is constrained to vertical translation, it is, of course, essential that the upper stretch of the band, or at least that portion thereof which engages the work, be constrained to travel in a vertical plane with its toothed edge facing downwardly. To so hold and guide the upper stretch of the band, a pair of saw guides 50 is provided. These guides may be of any suitable construction and, in the present instance, consist of flat faced blocks 51 between which the saw band travels. The blocks 51 are mounted in downwardly projecting holders 52 on the outer ends of arms 53 which, in turn, are longitudinally slidably received in ways machined into brackets 54 fixed to the opposite upper ends of the head. The machined ways in which the arms 53 slide are exactly in line with one another and parallel with the upper stretch of the band so that in any position of adjustment, the arms 53 hold the saw guides in position to constrain that part of the upper stretch of the band spanning the guides to travel in a vertical plane, with the toothed edge thereof facing downwardly.

Clamping screws with hand wheels 55 are provided to clamp the arms 53 in any adjusted position which, for best results, is that at which the saw guides are closely adjacent to the opposite sides of the work to be cut. Since the saw guides are carried by the movable head, it follows, of course, that they are at all times maintained in proper operative positions as the sawing operation proceeds.

Figure 5:
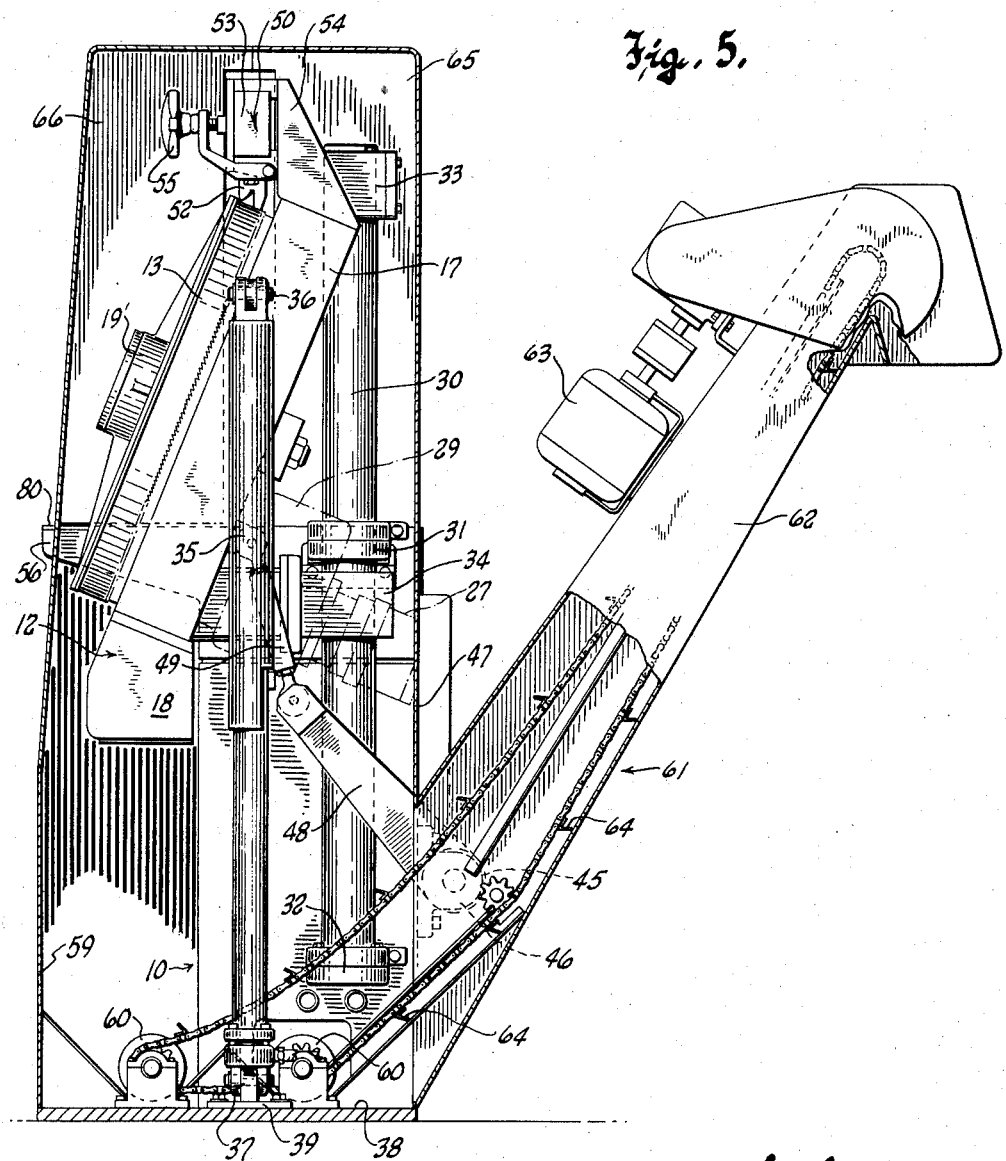
Figure 5 is essentially a cross sectional view through Figure 2 on the plane of the line 5—5.

As best seen in Figure 5, to hold the operative stretch of the saw band in its proper vertical plane, it is necessary that the upper stretch of the band be twisted. The extent to which the upper stretch of the band must be twisted depends upon the angle at which the saw carrying head is disposed. Thus, for instance, if the head were in an exactly upright position so that the axes of the two pulleys were horizontal, it would require a 90 degree twist in the upper stretch of the band to dispose its cutting portion in a vertical plane. Therefore, since the movable head is disposed at an angle which, in practice, is in the neighborhood of 20-25 degrees from the vertical, it follows that the amount of twist required to properly dispose the cutting portion of the band is considerably less than 90 degrees and the angle at which the head is placed.

Figure 3:
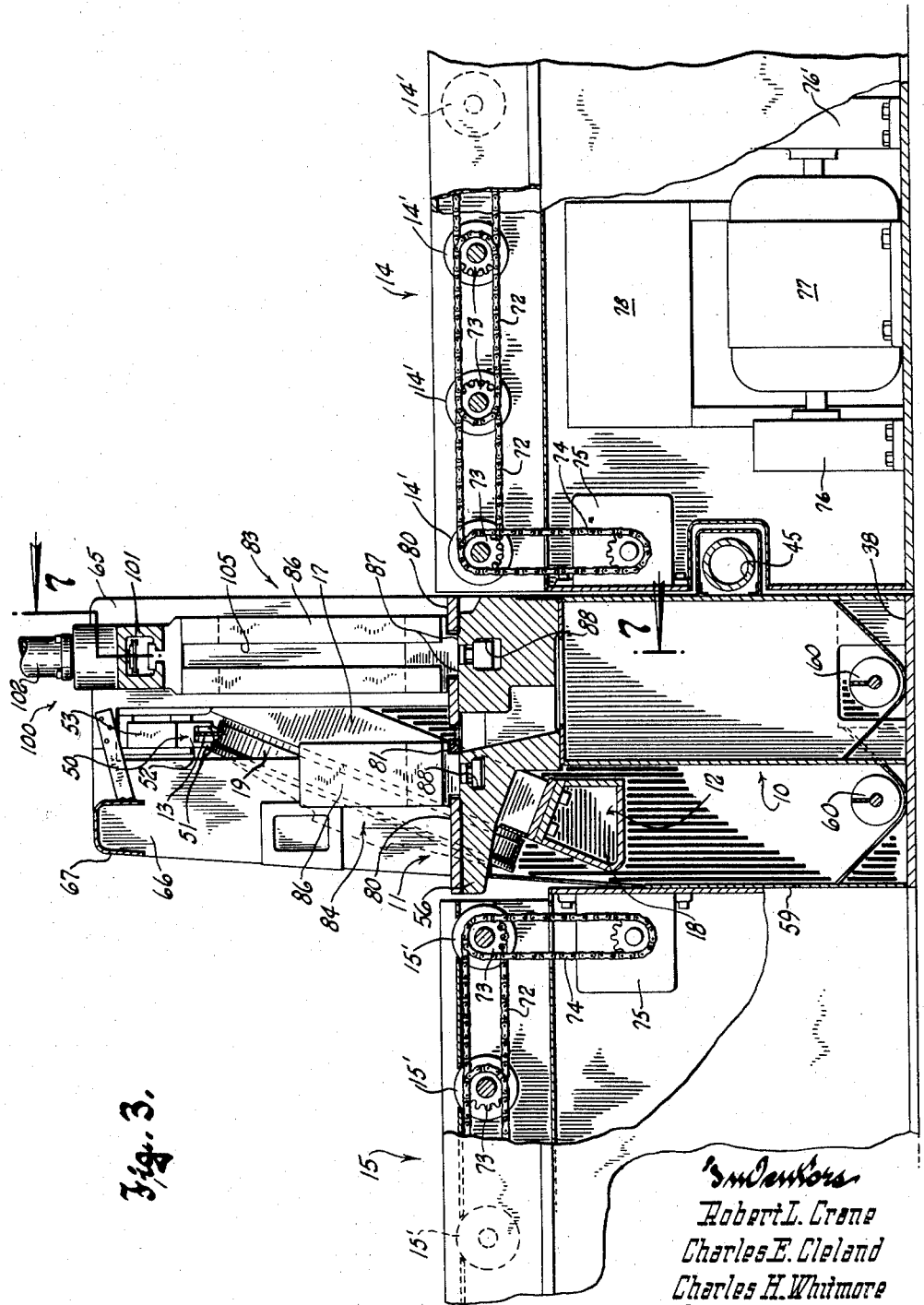
Figure 3 is a cross sectional view through Figure 2 on the plane of the line 3—3.

The angular disposition of the head not only has the advantage of minimizing the extent the saw band must be twisted, but it also locates the lower stretch of the band at a substantial distance from the plane of the cut as heretofore mentioned, and this removes the lower stretch of the band from the zone of falling chips which results from the cutting operation. Actually, as best seen in Figure 3, the lower stretch of the band is so far forward of this zone, that there is practically no possibility for chips to drop onto this lower stretch of the band. If this were permitted, it would interfere greatly with the proper tracking of the band on the pulleys.

It should also be appreciated that by having the lower stretch of the band located where it is, there is small likelihood that the liquid coolant used in the sawing operation will drop down onto the band and thereby interfere with proper traction between the band and the pulley rims, it being understood that liquid coolant is copiously applied to the band just as it enters the work zone, in the manner set forth in U.S. Patent No. 2,815,562.

Further protection against having chips and coolant drop down onto the lower stretch of the band results from the fact that the work supporting table has a forwardly projecting ledge portion 56 which at all times is above the lower stretch of the band.

Coolant reservoir and chip removal

The main base 10 is a hollow box structurally strong enough to support the work and the movable saw head. Its top which provides the work support 11 is a heavy iron casting of which the forwardly projecting ledge 56 is a part. A groove 57 extends lengthwise across the top of this casting to receive the upper cutting stretch of the saw band so that the saw may cut all the way through the work, and extending down from the bottom of this groove and all the way through the casting are ports 58 through which coolant and chips may drop into the hollow interior of the base. The base thus provides a receptacle for the chips and a reservoir for liquid coolant.

For aesthetic purposes, and also to provide an additional coolant reservoir and chip receptacle, a housing 59 is provided. This housing, like the main base, is formed of plate stock welded together and it extends beyond the ends of the main base and across the front thereof to provide a second coolant and chip receptacle along the front of the main base and beyond the ends thereof. The walls 47 upon which the bearings for the torque rod are mounted, are a part of this housing 59, and it should be noted that these walls 47 have holes 47' through which the lever arms 48 of the torque rod project.

The coolant and chip receptacles provided by the interior of the main base and the housing 59 each have a screw conveyor 60 mounted in the bottom thereof to convey chips to an elevator mechanism indicated generally by the numeral 61 which carries them upwardly through an inclined discharge chute 62. The chute 62 is a hollow box-like structure projecting like an arm from the rear wall at the right hand end of the machine (as viewed from the front) and mounts an electric motor 63 which drives the chip elevator 61 through suitable transmission gearing.

The chip elevator consists of a pair of endless chains trained about suitable sprocket wheels and having flights 64 fixed thereto to ride across the inclined bottom wall of the discharge chute and thereby carry the chips upwardly to the open mouth thereof. Two of the sprockets over which each chain is trained are fixed to the ends of the screw conveyor 60 so that the motor 63 also drives these conveyors. Since the chip elevator 61 travels slowly, the liquid coolant drains from the chips before they reach the mouth of the chute and, hence, the discharged chips are quite dry.

The housing 59 or, more specifically, the portion thereof which extends across the front of the main base, has the bight portion of the movable head received therein so that, as the head descends in its cutting operation, the bight thereof drops down into the housing. Thus, at all stages of its operation, the appearance of the machine is neat and uncluttered.

Figure 1:
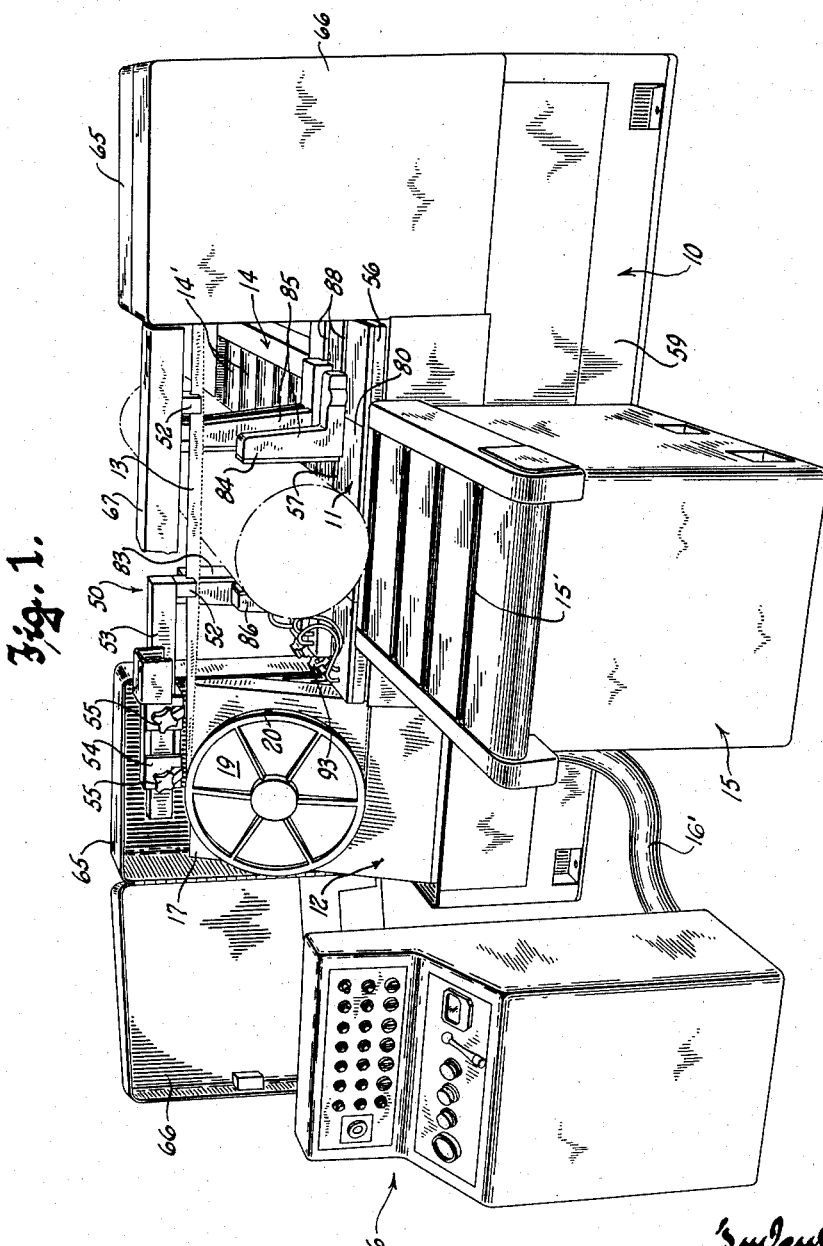
Figure 1 is a perspective view of a power saw constructed in accordance wtih this invention.
Figure 2:
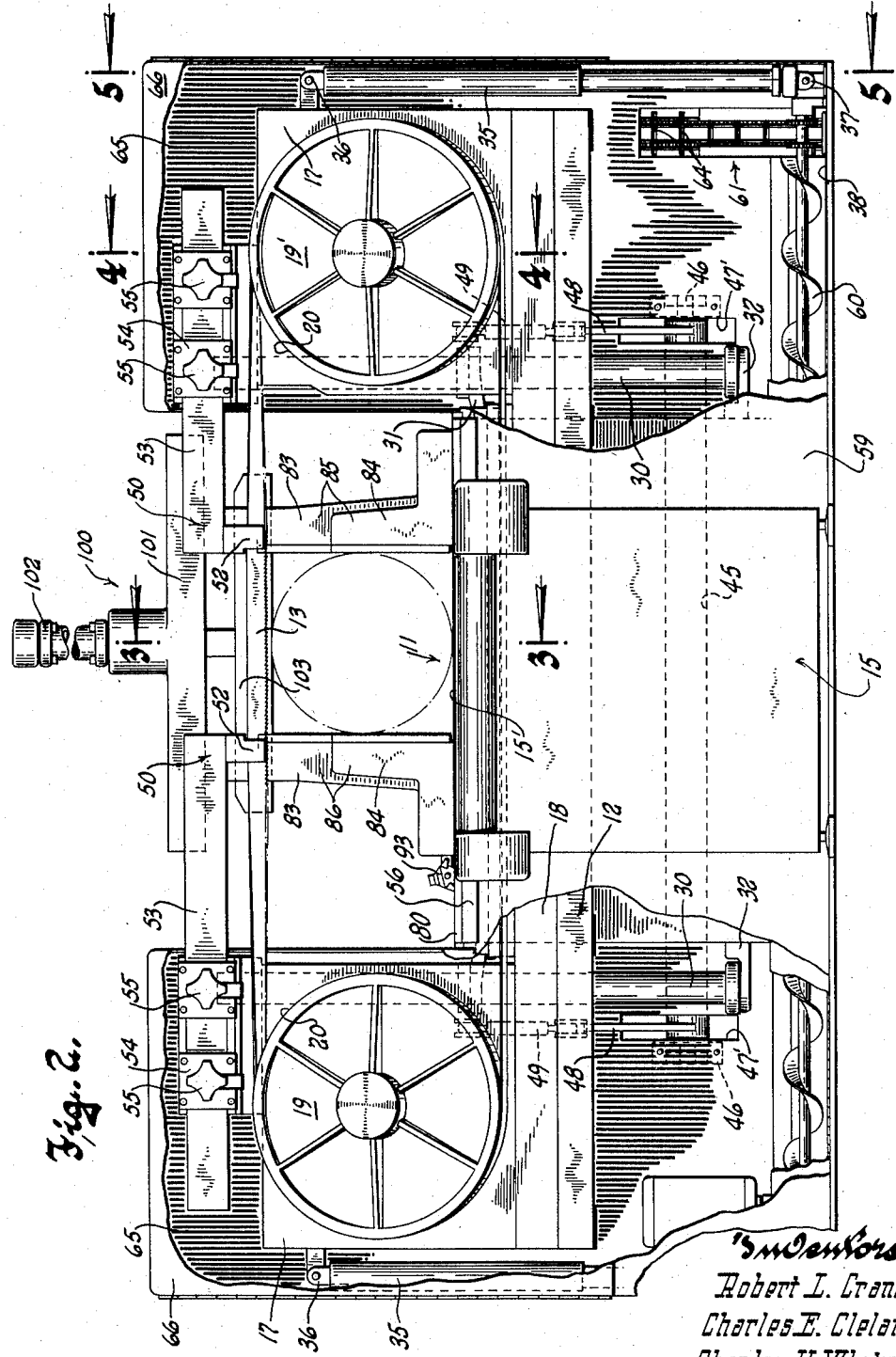
Figure 2 is a front elevational view of the power saw with parts thereof broken away to better illustrate structural features thereof.

To the same purpose, but also for the sake of protection for workmen, the band pulleys and, in fact, the entire opposite end portions of the movable head are enclosed in upward projections 65 of the housing. These upwardly projecting housing portions have hinged doors 66 which may be swung open, as shown in Figure 1, to afford access to the pulleys and the band for removal and replacement of the band. Preferably also, the upwardly projecting housing portions are connected by a channel-shaped guard rail 67 which extends across the upper front of the machine.

Work feeding and receiving tables

The work feeding and receiving tables 14 and 15, like the main base of the machine, are preferably constructed of plate stock welded together to form rigid hollow structures. The top of each of these units is essentially channel-shaped in cross section so as to accommodate the rollers 14' and 15'. These rollers, of course, provide the actual work supports of these feeding and receiving tables, and are interconnected by chains 72 trained over sprockets 73 fixed to the rollers. In each instance, the roller nearest the machine proper is drivingly connected through a chain 74 with a fluid motor 75. These fluid motors are supplied with fluid under pressure under control of suitable instrumentalities on the panel or console 16 so that work received on the rollers may be advanced into cutting position or retracted.

The hollow interior of the work feeding table 14 provides a convenient place for the fluid pressure source, which may be in the form of a pair of pumps 76—76' driven by an electric motor 77, and a tank or reservoir 78 for the hydraulic fluid.

Work holding vises

The work to be cut is normally placed upon the conveyor rollers of the work feeding table or unit 14 by which it is advanced onto the work supporting table 11. This table, as already explained, is a heavy iron casting, and preferably its top surface is protected by wear plates 80 which may be replaced when worn, and which, of course, are interrupted, as at 81, to permit the upper stretch of the saw band to pass down below the level of the table for completion of the cut.

It goes without saying, that the work must be securely held during the cutting operation and, to this end, a main or inboard vise 83 and an outboard vise 84 are provided, the former being directly rearwardly of the cutting plane and the latter directly forwardly thereof. Each of these vises has a fixed upright jaw 85 and a movable upright jaw 86, both of which are slidably seated upon ways 87 extending across the table, and guided for movement along these ways by tongues on the underside of the jaws extending down into T slots 88. The fixed jaws 85 are adapted to be secured to the table in either of two positions by means of removable pins 89, and the movable jaws 86 are power operated either toward or from the fixed jaws. To so move the jaws 86, each has a hydraulic cylinder 90 with the piston rod 91 thereof projecting from the side of the jaw in longitudinal alignment with and directly over a row of teeth 92 on the table. A double acting pawl 93 pivotally mounted on the end of the piston rod 92 cooperates with the teeth 92 to hold the piston against movement in one direction or the other. The opposite ends of the cylinder are connectible with the source of fluid pressure under control of suitable instrumentalities which may be located on the control panel or console. Thus, by controlling the pressure in the opposite ends of its cylinder, the position of each movable jaw may be adjusted as required, and work may be clamped in these vises.

The main or inboard vise 83 is equipped with a hold-down or clamp, indicated generally by the numeral 100, which may be used in coaction with the upright jaws 85 and 86 to hold such work as a bundle of rods to be simultaneously cut off to a given shorter length. This hold-down comprises a cross beam 101 slidably keyed to the tops of the jaws 85 and 86; a hydraulic cylinder 102 extending up from the center of the cross beam; and a pressure bar 103 connected to the ram of the cylinder and spanning the distance between the jaws 85 and 86 with its ends received in slots 104 and 105 in these upright jaws. Thus, through controlled operation of the hydraulic cylinder 102 the pressure bar 103 may be pressed down against work received between the upright jaws.

A feature of the hold-down 100 is that its pressure cylinder 102 is always maintained in centered relation with respect to the upright jaws 85 and 86, despite adjustment of the spacing therebetween. This desirable result is obtained through the provision of a centering device consisting of an endless sprocket chain 106 trained about sprockets 107 and 107' rotatably mounted at the opposite ends of the cross beam 101. One stretch of the chain 106 is connected, as at 108, to the upright jaw 85, and the other stretch thereof is connected, as at 108' to the top of the upright jaw 86. Thus, as the upright jaws 85 and 86 move either toward or from each other, the sprocket chain is actuated to at all times hold the cross beam 101 in predetermined centered relation with respect to these upright jaws.

Though shown and described in this application, the vise structure comprising the hydraulically operated inboard jaws and hold-down means, together with the mechanism for maintaining the hold-down means centered with respect to the inboard jaws, forms the subject of and is claimed in our application Serial No. 772,256, filed November 6, 1958, as a division of this application.

From the foregoing description, taken in connection with the accompanying drawings, it will be readily apparent to those skilled in the art that this invention provides an entirely new way of cutting off bar stock, and that because of the novel innovations it has made in this art, great savings, both in time and money, have been made possible.

What is claimed as our invention is:

1. A metal cutting power saw comprising a base; a horizontal work support on the base; a movable saw carrying head; horizontally spaced pulleys mounted on the head with their axes parallel and their rims in line; an endless saw band trained about the pulleys; power means to drive one of the pulleys; cooperating means on the base and the head mounting the head for vertical translation with the two stretches of the band vertically spaced apart and the lower stretch beneath the work support; band guiding means carried by the movable head and engaging the upper stretch of the band at points spaced lengthwise thereof to hold the portion of the band therebetween in a vertical plane with its cutting edge facing downwardly to operatively engage and cut through work positioned on the work support as the head descends; and means to effect upward translation of the movable head to bring the upper stretch of the band into position to permit the work to be placed thereunder and downward translation to produce a cut.

2. The metal cutting band saw of claim 1 further characterized by the fact that the movable saw carrying head is U-shaped with the bight thereof positioned below the work support to one side of said vertical plane; and further characterized by the fact that the arms of said U-shaped head are inclined to extend across said plane, and that the axes of the pulleys are normal to said inclined arms so that the lower stretch of the band moves in a path spaced from said plane of the vertically disposed cutting portion of the upper stretch.

3. A metal cutting power saw comprising: a base; a horizontal work support on the base; a movable saw carrying head; a pair of horizontally spaced pulleys rotatably mounted on said head with their axes parallel and their rims in line; power means to drive at least one of the pulleys; an endless saw band trained about said pulleys; cooperating means on the base and said head slidably mounting the head for vertical translation with the opposite stretches of the saw band disposed in vertically spaced relation with the upper stretch above the work support and the lower stretch beneath the work support; band guiding means on the movable head engaging the upper stretch of the band at lengthwise spaced points thereon to hold the portion of the stretch therebetween in a vertical plane, with the cutting edge thereof facing downwardly toward the work support; and means connected to said movable head to positively constrain the opposite ends thereof to up and down movement in unison, said means comprising a torque rod journalled in fixed bearings to turn on a horizontal axis parallel to said vertical plane of the upper stretch of the saw band, a lever arm fixed to each end of the torque rod, and a link connecting the free end of each lever arm with the movable head.

4. The metal cutting band saw of claim 3 wherein the cooperating means on the base and the movable head which slidably mounts the head for vertical translation comprises horizontally spaced vertical posts fixed to the base; and bearing means fixed to the movable head and slidably engaging said posts.

5. A metal cutting power saw comprising a base having opposite ends; a horizontal work support on the base between its opposite ends; a vertical guide post mounted on the base adjacent to each end thereof; a U-shaped movable saw carrying head endwise embracing the work support between its arms with the bight of the U lying beneath the work support; bearing means on the arms of the U-shaped movable head slidably receiving the guide posts to slidably mount the head for vertical translation with the arms of the head inclined to dispose their upper extremities above a portion of the work support spaced horizontally from the portion thereof beneath which the bight of the head is located; a torque rod having a lever arm fixed to each end thereof; fixed bearings mounting the torque rod for oscillation about a horizontal axis which is equispaced from said guide posts; a link connecting the free end of each lever on the torque rod to one end portion of the movable head so that said torque rod positively constrains the opposite ends of the movable head to move in unison as the head slides up and down on the guide posts; and an endless saw band mounted on the head with one stretch thereof spanning the upper end portions of its arms and disposed above the work support and its other stretch extending along the bight of the head so as to be below the work support; and means to effect up and down motion of the head.

6. A metal cutting cutoff saw of the type having an endless saw band trained over a pair of pulleys which are mounted on a movable head in horizontally spaced relation with the pulleys so oriented that the two stretches of the band spanning the pulleys travel along spaced upper and lower paths, characterized: by the fact that the upper stretch of the band is the cutting stretch; by the fact that said upper stretch of the band is twisted to dispose a medial portion thereof in a given vertical plane with its cutting edge facing downwardly; by the provision of structure mounting the saw carrying head for up and down motion; and by the provision of a work support fixed with respect to said structure, and located to position work to be cut between the upper and lower stretches of the saw band, beneath the medial portion of its upper stretch.

7. A metal cutting saw of the type having an endless saw band trained over a pair of pulleys which are mounted on a rigid member in horizontally spaced relation with the pulleys so oriented that the two stretches of the band spanning the pulleys travel along spaced upper and lower paths, characterized: by the fact that the upper stretch of the band is the cutting stretch; by the fact that said upper stretch of the band is twisted to dispose a medial portion thereof in a given vertical plane with its cutting edge facing downwardly; by the provision of a work support located to position work to be cut between the upper and lower stretches of the saw band beneath the medial portion of its upper stretch; by the provision of structure connecting said rigid member and work support for relative bodily vertical motion, and by which motion the upper cutting stretch of the saw band and work on the support are brought into engagement; and by the provision of means to effect such relative bodily motion to cause the upper cutting stretch of the saw band to cut through the work.

References Cited in the file of this patent

UNITED STATES PATENTS

| 321,698 | Eberhardt | July 7, 1885 |
| 1,344,096 | Sprague | June 22, 1920 |
| 1,384,732 | Schermer | July 12, 1921 |
| 2,602,987 | Wells | July 15, 1952 |
| 2,608,747 | Gamboney | Sept. 2, 1952 |
| 2,669,261 | Bowers et al. | Feb. 16, 1954 |
| 2,691,206 | Kautz | Oct. 12, 1954 |
| 2,706,432 | Daugherty | Apr. 19, 1955 |
| 2,769,224 | Hake | Nov. 6, 1956 |
| 2,815,562 | Wilkie et al. | Dec. 10, 1957 |

FOREIGN PATENTS

| 819,766 | Germany | Nov. 5, 1951 |